No. 48,657.  W. & L. CLAYTON.  PATENTED JULY 11, 1865.
CIDER MILL.

Witnesses:

Inventors:
W. & L. Clayton

UNITED STATES PATENT OFFICE.

WILLIAM CLAYTON AND LEWIS CLAYTON, OF WEST PHILADELPHIA, PA.

IMPROVEMENT IN CIDER-MILLS.

Specification forming part of Letters Patent No. 48,657, dated July 11, 1865.

*To all whom it may concern:*

Be it known that we, WILLIAM CLAYTON and LEWIS CLAYTON, of West Philadelphia, in the county of Philadelphia and State of Pennsylvania, have invented a new and useful Improvement in Cider-Mills; and we do hereby declare that the following is a full, clear, and exact description thereof, which will enable others skilled in the art to make and use the same, reference being had to the accompanying drawings, forming part of this specification.

The present invention consists in arranging around and upon a cylinder in the direction of its length, and either straight or spirally, a series of knives or scrapers, said knives being so attached to the said cylinder as to be readily removed therefrom or adjusted with regard to the same at pleasure. This cylinder is hung by shafts turning in suitable bearings of an outer casing or box, to which the apples to be manufactured into cider are fed through a hopper, and as they pass downward to and between the knife-cylinder and its casing are, by the revolution of the said cylinder in any proper manner, thoroughly and completely scraped or shaved by its knives into thin slices or pieces, which then fall into a receptacle below, from which they are taken to the press and subjected to sufficient pressure by any of the usual modes practiced to entirely express the juice therefrom. In connection with the said knife-cylinder, arranged and operating as described, we also employ a flexible flap so arranged as to bear upon the cylinder as it revolves, but yet allow of its knives to freely pass by for the purpose of cleansing it of all portions of the apples that may adhere to it, as will be presently described.

Figure 2:
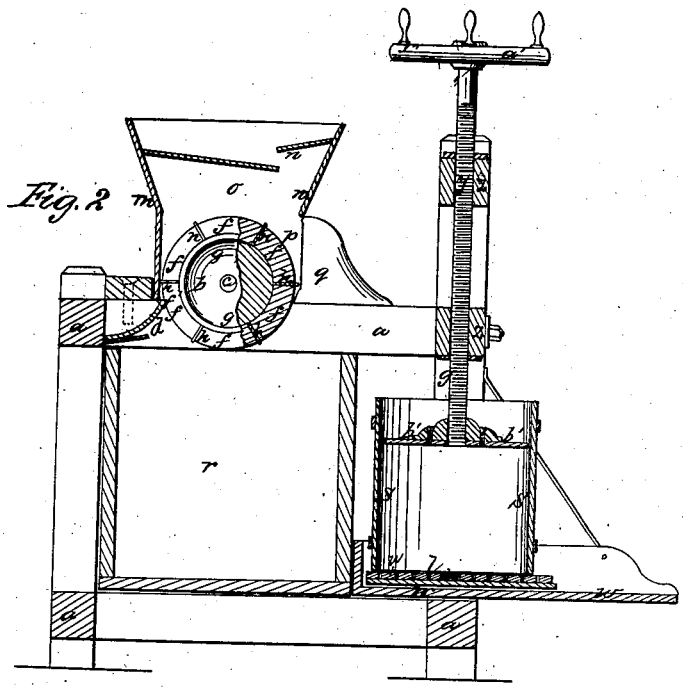
Figure 1:
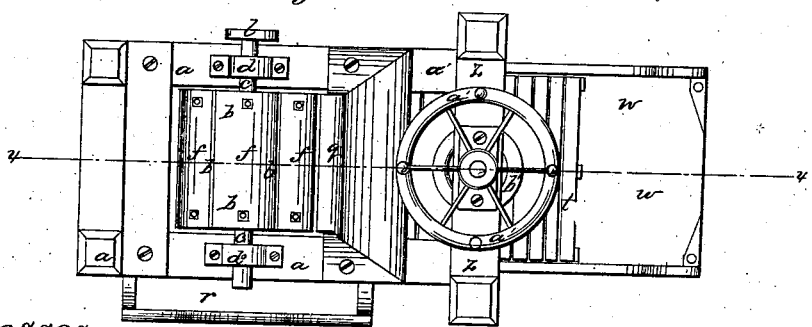

Our improvement is illustrated in accompanying plate of drawings, of which Figure 1 is a plan or top view, showing the mill with its hopper removed, and a cider-press; and Fig. 2, a longitudinal vertical section in plane of line $x$ $x$, Fig. 1.

$a$ $a$ in the drawings represent the frame-work of the mill, across the upper portion of which is placed a cylinder, $b$, having short shafts $c$ $c$ at each end, turning in bearings $d$ $d$ of the framework $a$ $a$. This cylinder $b$ is made in sectional pieces, $f f$, &c., secured by means of screw nuts and bolts to and upon the main portion $g$ of the same, between each of which sections, and attached to the same by means of screws or in any proper manner so as to be easily removed therefrom or adjusted thereon at pleasure, is a plate or strip of metal, $h$, having either its outer edge sharpened or square shaped, as may be desired.

To the cylinder $b$, provided with a series of cutters or scrapers, $h$ $h$, &c., as described, a rotary movement is imparted through the pulley $l$ of its shaft $c$, connected by any suitable devices with the driving-power used.

$m$ $m$ represent a hopper placed over and about the knife-cylinder $b$, upon the frame-work $a$ $a$ of the machine, in which hopper the apples from which cider is to be manufactured are placed, and gradually fed thereby through its opening $n$ into the chamber $o$ below over the knife-cylinder, dropping into the opening or space $p$ between said cylinder and the cross-bar $q$ of the frame-work $a$, where, as the cylinder is revolved, as described, they are scraped by its knives into fine and thin slices or pieces, which pass downward and into the receptacle or box $r$, placed below and within the frame-work $a$, from which they are conveyed to the press used for expressing the juice therefrom.

On one side of the cider-mill a press is represented, which consists of a vertical cylindrical casing, $s$, open at both ends, and with a series of openings in its side placed upon a frame, $t$, made of a series of parallel slats, $u$ $u$, fastened together by cross-bars, with spaces between the same, which frame is laid upon a platform, $u$.

$y$ $y$ represent a vertical screw-shaft or rod turning in cross-pieces $z$ $z$ of frame-work $a$, having on its upper end a wheel, $a'$, provided with suitable handles for turning the same, and on its lower end a flat-shaped head or plate, $b'$.

In the casing $s$ the apples, sliced and scraped, as described, are placed within a bag or bags, made of any suitable textile fabric or material, and then subjected to pressure by turning the screw-shaft in the proper direction to cause its head to bear and press down upon the same, expressing all the juice contained therein, which, passing out of the casing through its open bottom and sides onto the platform $w$, is conveyed thereby to the casks or barrels, or other devices used to contain it.

By subjecting the apples to the revolving cylinder provided with a series of knives or scrapers, as described, it is evident that they are caused to be thoroughly and completely sliced, scraped, or cut into very thin slices or pieces, so that when subjected to pressure, a greater quantity of cider can be obtained therefrom than heretofore possible from the usual modes practiced for disintegrating or cutting up the apples preparatory to expressing the cider or juice therefrom.

$d'$ is a flexible flap, made of leather or other suitable material, fastened by one edge to framework $a\ a$, so that its other or outer edge, $f'$, shall bear upon the cylindrical knife-drum $b$ long the entire length of the same, and upon the opposite side to that where the apples are scraped or sliced, as described. The purpose of this flap is to scrape or remove from the cylinder all portions of the apples which may possibly adhere thereto in its revolution, and to cause them to drop into the box below—the knives by its flexibility freely passing by the same.

In lieu of arranging the knives or scrapers upon the cylinder in a straight direction, as described, they may be placed spirally thereon, and therefore we do not intend to limit ourselves to any particular direction in which the knives are to be placed; and, also, there may be any desired number of knives other than that herein described, and represented in the drawings.

Having thus described our invention, we claim as new and desire to secure by Letters Patent—

1. The combination of the cylinder $g$, sectional pieces $f$, adjustable metallic strips $h$, with sharpened edges, and flexible flap $d'$, in a cider-mill, as and for the purposes herein set forth.

2. The flexible flap $d$, arranged as and for the purposes described.

WILLIAM CLAYTON.
    LEWIS CLAYTON.

Witnesses:
 ALBERT W. BROWN,
 M. M. LIVINGSTON.